(12) United States Patent
McSwaney et al.

(10) Patent No.: US 8,285,566 B2
(45) Date of Patent: Oct. 9, 2012

(54) METHODS AND SYSTEMS FOR ADMINISTERING INDEXED LIFE INSURANCE

(75) Inventors: John McSwaney, Stuart, FL (US); Anthony Ginsberg, Beverly Hills, CA (US); Ben Wolzenski, St. Louis, MO (US)

(73) Assignee: Security Life of Denver Insurance Company, Malvern, PA (US)

( * ) Notice: Subject to any disclaimer, the term of this patent is extended or adjusted under 35 U.S.C. 154(b) by 669 days.

(21) Appl. No.: 12/124,694

(22) Filed: May 21, 2008

(65) Prior Publication Data
US 2009/0089102 A1 Apr. 2, 2009

Related U.S. Application Data

(60) Provisional application No. 60/931,078, filed on May 21, 2007.

(51) Int. Cl.
*G06Q 40/00* (2012.01)
(52) U.S. Cl. .............................................. 705/4; 705/35
(58) Field of Classification Search ............ 705/4, 36 R, 705/39
See application file for complete search history.

(56) References Cited

U.S. PATENT DOCUMENTS

| | | | |
|---|---|---|---|
| 5,291,398 A | 3/1994 | Hagan | |
| 5,429,506 A | 7/1995 | Brophy et al. | |
| 5,631,828 A | 5/1997 | Hagan | |
| 5,655,085 A | 8/1997 | Ryan et al. | |
| 5,752,236 A | 5/1998 | Sexton et al. | |
| 5,806,042 A | 9/1998 | Kelly et al. | |
| 5,907,828 A | 5/1999 | Meyer et al. | |
| 5,926,800 A | 7/1999 | Baronowski et al. | |
| 5,966,693 A | 10/1999 | Burgess | |
| 6,049,772 A * | 4/2000 | Payne et al. | 705/4 |
| 6,343,272 B1 | 1/2002 | Payne et al. | |
| 6,456,979 B1 | 9/2002 | Flagg | |
| 6,950,805 B2 | 9/2005 | Kavanaugh | |
| 6,963,852 B2 | 11/2005 | Koresko, V | |
| 7,080,032 B2 | 7/2006 | Abbs et al. | |
| 7,324,950 B2 | 1/2008 | Sherman | |
| 7,343,333 B2 | 3/2008 | Menke | |
| 2002/0007329 A1* | 1/2002 | Alcaly et al. | 705/35 |
| 2006/0041453 A1* | 2/2006 | Clark et al. | 705/4 |

OTHER PUBLICATIONS

Diversified Financial Products, Inc. Issues Wrapped Index Return, the Industry's First No-Fee Index Wrap for Retirement Plans. Business Wire. Aug. 28, 1998.*

Introducing Emergin Edge Annuity from AIG American General; simple to - sell Annuity Offers Diversification, Flexibility to Provide Performance for Policyholders. Business Wire. Aug. 16, 2006.*

American General Life Breaks New Ground with Global Multi-Index Insurance Product; AIG Elite Global IUL Bases Product Accumulation in Part on the Performance of Multiple External Financial Indices. Business Wire. Aug. 15, 2006.*

* cited by examiner

*Primary Examiner* — Kelly Campen
*Assistant Examiner* — John Preston
(74) *Attorney, Agent, or Firm* — Scott A. Felder; Wiley Rein LLP

(57) ABSTRACT

Disclosed is a system and method for administering a life insurance policy to provide increased interest based on specifically weighted linkage to multiple equity indices that typically may include Standard & Poor's 500 Composite Price Index, Dow Jones EURO STOXX 50, the Hang Seng Index, and/or derivatives thereof wherein the leading-performing index during a look back period is weighted more heavily than any other index. Also disclosed is a computer system using at least one administration component to implement a series of steps associated with administering an equity indexed-interest universal life insurance policy.

15 Claims, 2 Drawing Sheets

METHODS AND SYSTEMS FOR ADMINISTERING INDEXED LIFE INSURANCE

CROSS-REFERENCE TO RELATED PATENT APPLICATIONS

This patent application claims the benefit of U.S. Provisional Patent Application No. 60/931,078, filed May 21, 2007, and entitled "Methods And Systems For Administering Indexed Life Insurance," which is incorporated in its entirety herein by this reference.

FIELD OF THE INVENTION

This invention pertains to the administration of indexed life insurance policies, and more particularly to methods and systems for administering life insurance by tracking multiple indexes to provide increased interest and improved return on premium investments.

BACKGROUND OF THE INVENTION

Current life insurance solutions generally do not provide for product investment returns that participate in global equity market growth in a framework that is easy for the owner of the policy to manage and implement.

Other financial vehicles for investment security exist besides life insurance policies. For instance, an annuity is a financial vehicle used to pay a person a certain sum of money in a series of distributions made at regular intervals. U.S. Pat. No. 7,080,032 discloses an annuity that provides a guaranteed rate of return for a guarantee period while at the same time providing upward adjustments to the interest rate if there is a corresponding increase in a specified reference rate, which may be a U.S. Treasury rate or an interest rate that is used to settle a contract that is traded on a financial futures exchange.

A general system for analyzing and managing equity participation life insurance and annuity contracts is disclosed in U.S. Pat. No. 6,343,272, which discloses a system that manages the increased risk from participation in the stock market by periodically monitoring assets and liabilities and determining the purchase and sale of stock options and other hedging instruments to cover the risks.

Continuing financial needs exist to provide life insurance policy products by using various specific methods and systems to provide increased returns on premium investment and correspondingly increased death benefits and/or equivalent cash value.

BRIEF SUMMARY OF THE INVENTION

The disclosure concerns a system and method for administering a life insurance policy by performing several steps. Such steps can include the following: defining a point-to-point return for at least two indices over a predefined period once the predefined period has ended; determining a best performing index (Index 1) and a second best performing index (Index 2) by comparing the point-to-point returns of the two or more indices; calculating an adjusted index return by adding a first weighted percentage of the value of the Index 1 return to a second weighted percentage of the value of the Index 2 return, wherein the first weighted percentage is greater than 50%, the second weighted percentage is equal to 100% minus the first weighted percentage; calculating an indexed interest rate based upon the adjusted indexed return; and applying the indexed interest rate to the value of the life insurance policy after the predetermined period has ended when the indexed interest rate is greater than zero. At least one of such steps can be performed using a computer.

In another aspect of the disclosure, a method for administering an indexed life insurance policy can include: (i) defining a base interest rate and applying the base interest rate to the value of a life insurance policy for a predefined period; (ii) defining a point-to-point return for two or more indices over the predefined period once the predefined period has ended; (iii) determining a best performing index (Index 1) and a second best performing index (Index 2) by comparing the point-to-point returns of the two or more indices; (iv) calculating an adjusted index return by adding a weighted percentage X of the value of the Index 1 return to a weighted percentage 100%–X of the value of the Index 2 return, wherein X is greater than 50%; (v) calculating an indexed interest rate by multiplying the adjusted index return by a predetermined participation rate and subtracting the base interest rate; and (vi) applying the indexed interest rate to the value of the life insurance policy after the predetermined period has ended when the indexed interest rate is greater than the base interest rate.

In one aspect, the invention can provide a method of administering a life insurance policy comprising the above steps wherein the predefined period is one, two, or five years, for example. In another aspect, multiple indices may be evaluated that typically include standard indices such as Standard & Poor's® 500 Composite Price Index, Dow Jones EURO STOXX® 50, the Hang Seng Index, and/or derivatives thereof.

In another embodiment of the disclosure, a method of providing an equity indexed life insurance policy can include a guaranteed base interest rate of at least about 2.5% calculated on an annual basis. The method of administering the insurance policy can include the step of transferring a premium payment to add value to the life insurance policy and can include the eventual step of obtaining a death benefit and or a cash value from the life insurance policy.

In yet another embodiment of the disclosure, a computer system can be provided that uses at least one administration component to implement a series of steps associated with administering an equity indexed life insurance policy. In yet another aspect of the disclosure, a computer program product for use with a computer can be provided that includes a computer usable medium having computer readable program code embodied therein. The computer readable program code can include a base interest rate segment for applying a base interest rate to a value of a life insurance policy for a predefined period. A point-to-point return segment can be provided for defining a point-to-point return for at least two indices over the predefined period. A determining segment can be provided for determining a best performing index (Index 1) and a second best performing index (Index 2) by comparing the point-to-point returns of the at least two indices. An adjusted index return segment can be provided for calculating an adjusted index return by adding a first weighted percentage of the value of the Index 1 return to a second weighted percentage of the value of the Index 2 return, wherein the first weighted percentage is greater than 50% and the second weighted percentage is equal to 100% minus the first weighted percentage. An applying segment can be provided for determining the value of the life insurance policy after the predetermined period has ended based at least in part on the adjusted index return.

Additional features, embodiments, and details of this invention can be obtained from the following detailed description of embodiments of the invention.

BRIEF DESCRIPTION OF THE APPENDICES

Figure 1:
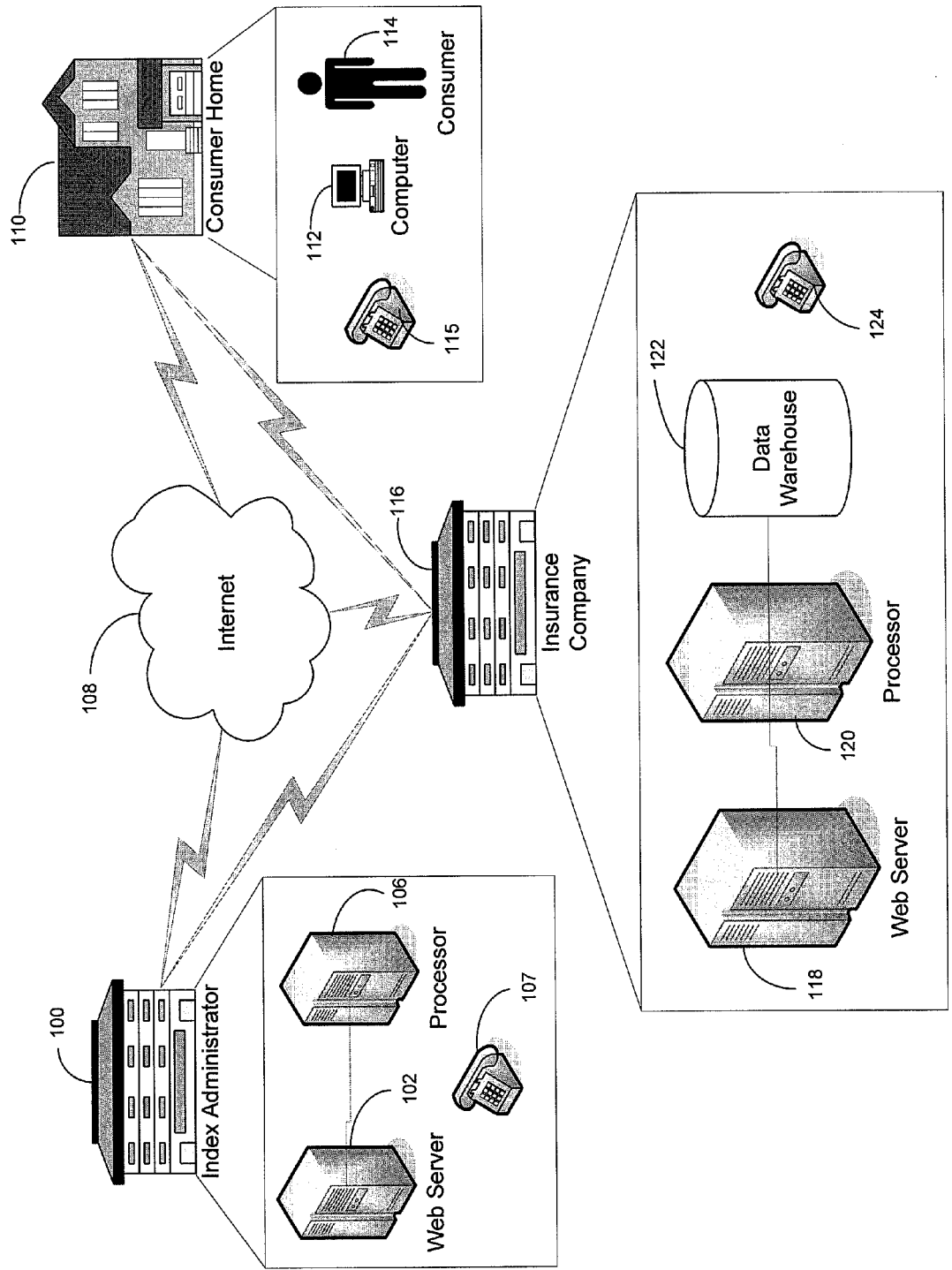
FIG. 1 illustrates a general architectural overview of a system contemplated by an exemplary implementation of a system for administering indexed life insurance.

Appendix 1 is an illustration of an indexed flexible premium adjustable universal life insurance policy suitable for use with an embodiment of the present invention.

Appendix 2 is a specimen indexed flexible premium adjustable life insurance policy suitable for use with an embodiment of the present invention.

DETAILED DESCRIPTION OF EMBODIMENTS OF THE INVENTION

The disclosure is directed to indexed universal life insurance, in which an interest crediting rate is based on the performance of one or more external financial indices such as the Standard & Poor's 500 Composite Stock Price Index (S&P 500® Index). Interest is calculated based, in part, on changes in the index (without dividends) and credited at the end of the index crediting term. Like other universal life insurance policies, indexed policies can also offer a guaranteed minimum interest crediting rate, so interest is guaranteed to be credited to policy values regardless of how the financial index performs. Because returns are based, in part, on a specific index's performance, indexed universal life may offer a greater potential for cash value growth. However, if the external index performs poorly, the indexed interest credited to a policy may be less than interest credited under life insurance policies that provide guaranteed fixed interest rates. In some years, the policy may not receive any indexed interest.

While indexed interest credited to the policy is based on the performance of the external indices, the policy does not directly participate in the index or in any stock or equity investment, and the consumer is not buying shares of any index or stock. The market indices do not reflect the dividends paid on the stocks underlying the market indices. The actual amount of indexed interest, if any, credited to an indexed universal life policy can vary based on the performance of those indices and on the "participation rate," which the insurance company can set and change based on: the interest rate environment, the cost of options and other economic factors. There can be substantial variation in the amount of indexed interest credited over the life of the policy.

In an embodiment of the invention, multiple indices are tracked to provide diversification and balance risk with administering a life insurance policy. Indexed interest is credited based on a predetermined time period, or look back period, which can one year, two years, or five years, for example. In other embodiments, the time period can vary. Such insurance provides death benefits as well as the opportunity for cash value accumulation based in part on the performance of three key world indices, including the following: (1) Standard & Poor's 500 Composite Price Index—500 leading US companies that is a large cap index representing 70% of the market capitalization of US publicly traded companies, (2) Dow Jones EURO STOXX 50—50 leading European companies in leading industries in the Euro-zone which is made up of 12 countries, and (3) Hang Seng Index—33 largest companies representing 70% of the total market capitalization of all stocks listed on the stock exchange of Hong Kong (SEHK). At the end of the look back period, a point-to-point return for each index is determined. In the calculation of indexed interest for the look back period, the participation rate is applied to 75% of the best performing index, 25% of the second best performing index, and the worst performing index is dropped. The combination of multiple indices, the look back period, and a calculation overweighting the best performing indices can: (1) produce higher interest crediting rates than other interest crediting methodologies by overweighting the best performing index, (2) provide diversification to enhance the likelihood of positive index returns, and (3) reduce the volatility associated with year to year performance measurements by looking back over a multiyear period. The combination of these features results in an index interest crediting methodology providing excellent and unexpected results.

An indexed universal life policy typically is a flexible premium universal life insurance policy with an option to have the insurance company credit interest based in part on the potential growth of an outside index or indices, excluding dividends, without having any portion of the policy owner's cash values ever directly participate in any equity market. A predetermined participation rate typically may be selected and adjusted by the owner of the life insurance policy to create a percentage of indexed interest against a percentage of fixed or base interest.

A computer system for administering a life insurance policy according to the present invention can include at least one administration component that operates by performing at least one of the steps of a method of administering a life insurance policy according to the present invention using a computer and/or a computer network. Embodiments of the present invention can employ aspects of the technological arts in that aspects of the methods and systems for administering a life insurance policy program can be implemented using computer networks, computer readable programs, the internet, telephony, etc. For example, the premium associated with an insurance policy constructed in accordance with the present invention can be computed with the aid of a computer; any benefit paid to a loss payee can be sent electronically via an electronic funds transfer (EFT); underwriting steps can be performed with the aid of a computer network and the internet, including e-mail transmissions, and the use of electronic databases, and computational analyses; etc.

Referring to FIG. 1, an exemplary implementation of a general architectural overview of a system for administering indexed life insurance is shown. A life insurance company 116 can sell to a consumer 114 a universal life indexed insurance policy which is based upon at least two indices, at least one of which being overseen by an index administrator 100. The consumer 114 can purchase the indexed life insurance policy electronically via an electronic fund transfer to the insurance company 116. The insurance company 116 and the consumer 114 can communicate with each other over the internet 108 or with the use of telephony 124, 115 to allow the insurance company to acquire biographical data concerning the consumer 114 and policy details, such as premium price, account term, death benefits, etc. The biographical data and policy details can be stored in a data warehouse 122.

The insurance company 116 can communicate with one or more index administrators 100 over the internet 108 or standard telecommunication network 107, 124, for example, to allow the insurance company to determine the performances of at least two indices at an initial time and at a subsequent time after a predefined period of time has elapsed. Preferably, the insurance company acquires performance data for at least three indices. The insurance company 116 can implement a web server 118 to gather the index information. In other embodiments, the insurance company 116 can gather the performance data for the at least two indices from a third party source.

A processor 124 can be used to determine a best performing index (Index 1) and a second best performing index (Index 2) by comparing the point-to-point returns of the indices being tracked. The processor 124 can calculate an adjusted index return by adding a first weighted percentage X of the value of the Index 1 return to a second weighted percentage of the value of the Index 2 return. The first weighted percentage X can be greater than 50%, and the second weighted percentage can be equal to 100%−X. In one embodiment, the first weighted percentage can be at least 75%. The processor 124 can calculate an indexed interest rate by multiplying the adjusted index return by a predetermined participation rate and subtracting a predetermined indexed interest rate factor. The processor 124 can apply the indexed interest rate to the account value when the indexed interest rate is greater than zero.

The data warehouse 122 can store the data generated from the calculations of the processor 124, including, for example the new account value for the life insurance policy. The data warehouse may be a collection of databases (e.g., Access, SQL). The system can continue to operate as described during the account term of the life insurance policy sold to the consumer 114.

Figure 2:
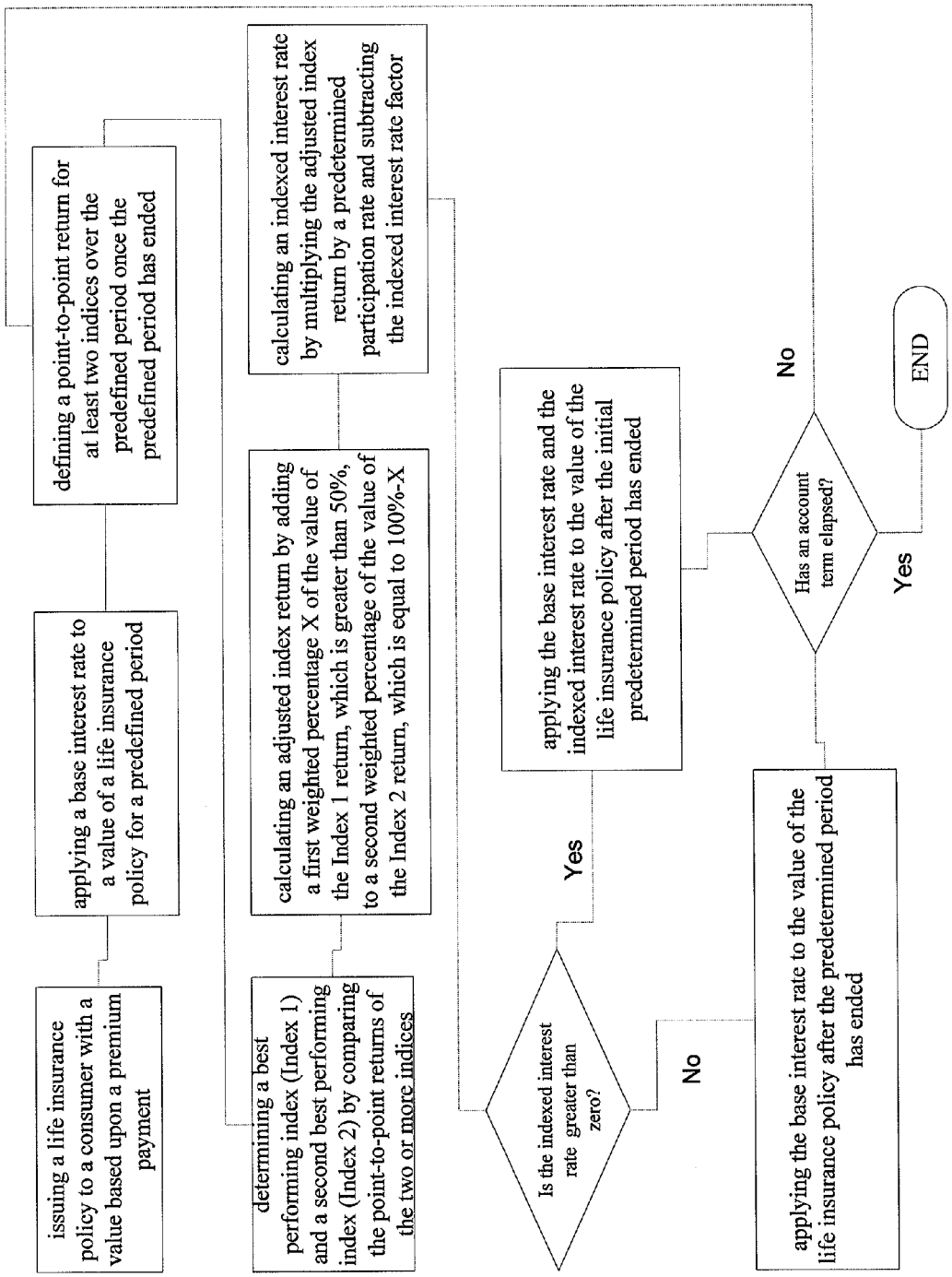
FIG. 2 is a flow diagram illustrating an exemplary method for administering indexed life insurance.

Referring to FIG. 2, a method for administering an indexed life insurance policy is shown in flow chart form. The method can be performed by the system of FIG. 1.

A computer program product for use with a computer according to the present invention can include a computer usable medium having computer readable program code embodied therein. The computer readable program code can include a base interest rate segment for applying a base interest rate to a value of a life insurance policy for a predefined period. A point-to-point return segment can be provided for defining a point-to-point return for at least two indices over the predefined period. A determining segment can be provided for determining a best performing index (Index 1) and a second best performing index (Index 2) by comparing the point-to-point returns of the at least two indices. An adjusted index return segment can be provided for calculating an adjusted index return by adding a weighted percentage, X, of the value of the Index 1 return to a weighted percentage, 100%−X, of the value of the Index 2 return, wherein X is greater than 50%. An applying segment can be provided for determining the value of the life insurance policy after the predetermined period has ended with the value of the life insurance policy being based at least in part on the adjusted index return.

The following example further illustrates the invention but, of course, should not be construed as in any way limiting its scope.

EXAMPLES

A typical indexed-interest universal life insurance policy would have an annual effective minimum guaranteed interest rate of 2.5%. The issue date would be once per month, generally on the $12^{th}$ of each month. The premium would be paid on the next business day if the 12th falls on a weekend or holiday, but the issue date of the policy would still be the $12^{th}$. The minimum death benefit would be $100,000. The death benefit options would include at least three choices as follows:

Option 1 (Level): Death benefit equal to the specified amount.
Option 2 (Increasing): Death benefit equal to the specified amount plus the accumulation value.
Option 3 (Return of Premium, or ROP): Death benefit amount equal to the amount payable under Option 1, plus the sum of all premiums paid.

Increases would be available under the policy at any time, subject to satisfactory evidence of insurability. After the first policy year, the policy owner may decrease the specified amount; however, the death benefit after reduction typically is not less than the minimum death benefit. Premiums would generally be expected to be billed on annual basis, with planned periodic premium generally not less than $300 annually. The plan generally will allow the owner of the policy to select the allocation between indexed and base interest at issue and such allocation can be changed at any time. Net premiums allocated to the base interest account will earn an interest rate to be declared by the company that may be subject to change periodically, but will generally not be less than 2.5% effective annually. The interest rate is based on the current interest rate environment and is credited at the end of each month.

The net premium allocated to the indexed interest account will generally have the following characteristics:
Each indexed account has duration of 5 years
A new indexed account can only be started each anniversary
Net premiums allocated to the indexed account that are received between anniversaries are put into an interim account and may receive excess interest until the next anniversary date, at which time the funds in the interim account are transferred to a new indexed account
On each anniversary, all or part of the un-loaned accumulation value in the excess interest account can be rolled to an indexed account
Money rolled to an indexed account must stay in indexed account for entire 5-year duration
Result is generally that a policy can have 5 indexed accounts and 1 excess interest account at any time
The indexed interest calculation would typically use the formula whereby at the end of the 5-year term, the following calculations are used to determine the indexed interest percentage and indexed interest:

$$\text{Indexed interest \%} = (\text{Adjusted index return}) \times (\text{Participation rate}) - (\text{Indexed interest rate factor})$$

$$\text{Indexed interest} = (\text{Indexed interest \%}) \times (\text{Eligible value})$$

The adjusted indexed return would typically be based on at least the three indices used to calculate the adjusted indexed return are (1) the S&P 500 Index, (2) the Dow Jones EURO STOXX 50 Index and (3) the Hang Seng Index. Thus at the end of each 5-year term, the value of each index is compared with the value at the beginning of that term. The best-performing index will account for 75% of the index return and the next-best performing index for 25%, while the index with the lowest return will not have an impact.

The participation rate determines the percentage of the return of the indices that is used to set the indexed interest percentages. There will be a unique participation rate for each indexed account. There can be 5 indexed accounts in effect for a policy determined at the beginning of each 5-year term year and guaranteed for the entire 5-year account term. If all 3 indices should yield negative returns in a given term, accumulation value in the matured indexed account will still receive the guaranteed 2.5 percent interest.

Generally the indexed interest rate factor is approximately equal to 13.14082% and this factor is approximately equivalent to the total return that would have resulted in the indexed account as a result of crediting guaranteed interest monthly during the 5-year term (ignoring the impact of policy charges, withdrawals, loans, etc.). The eligible value for an account is calculated as the sum of the guaranteed interest credited to the un-loaned accumulation value in that account during the 5-year term divided by the indexed interest rate factor. The eligible value is approximately equal to the weighted average of the accumulation values to which the guaranteed interest was applied each month. The accumulation values are then rolled into a new 5-year indexed interest account as needed.

Available riders include a terminal illness rider and a maturity extension. The terminal illness rider provides an accelerated death benefit (living benefit) when the insured is diagnosed with a terminal illness (e.g. 12 months or less to live) and a one-time acceleration benefit of up to 50% of the base policy death benefit (less policy loans and excluding riders), or up to a maximum of $250,000. The maturity extension allows extension of coverage beyond the original maturity date, with two forms available: an accumulation value option (MER-AV) and a death benefit option (MER-DB); however, California and Florida will use the old version of the MER-DB (form 95110-REV8/96). Note that Texas requires that one version of the benefit must be included for all new issues, and MER-DB may not be available in Maryland.

Another rider is the waiver of monthly deductions as they come due while the insured is totally disabled.

Appendices 1-2 provide further examples of life insurance policies suitable for use with the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of adjusting a value of a life insurance policy comprising:
   (i) defining a point-to-point return for at least two indices over a predefined period once the predefined period has ended;
   (ii) determining a best performing index (Index 1) and a second best performing index (Index 2) by comparing the point-to-point returns of the two or more indices;
   (iii) calculating an adjusted index return by adding a first weighted percentage of the value of the Index 1 return to a second weighted percentage of the value of the Index 2 return, wherein the first weighted percentage is greater than 50%, the second weighted percentage is equal to 100% minus the first weighted percentage;
   (iv) calculating an indexed interest rate based upon the adjusted indexed return; and
   (v) applying the indexed interest rate to the value of the life insurance policy after the predetermined period has ended when the indexed interest rate is greater than zero;
   wherein at least one of steps (i)-(v) is performed by employing a processor to execute computer executable instructions stored on a tangible computer-readable medium.

2. The method of claim 1, wherein the predefined period is one year.

3. The method of claim 1, wherein the predefined period is at least two years.

4. The method of claim 1, wherein Index 1 and Index 2 are determined by comparing three or more indices.

5. The method of claim 1, wherein the indices are selected from the group consisting of Standard & Poor's 500 Composite Price Index, Dow Jones EURO STOXX 50, the Hang Seng Index, and derivatives thereof.

6. The method of claim 1, wherein the first weighted percentage is at least 75%.

7. The method of claim 1, wherein the indexed interest rate is calculated by multiplying the adjusted index return by a predetermined participation rate and subtracting a predetermined index interest rate factor.

8. The method of claim 7, further comprising: defining a base interest rate and applying the base interest rate to the value of the life insurance policy after the predetermined period has ended.

9. The method of claim 8, wherein the indexed interest rate factor is approximately equivalent to the base interest rate.

10. The method of claim 1, further comprising: defining a base interest rate and applying the base interest rate to the value of the life insurance policy after the predetermined period has ended.

11. The method of claim 10, wherein the base interest rate is at least about 2.5% on an annual basis.

12. The method of claim 1, further comprising the step of receiving a premium payment to add value to the life insurance policy.

13. The method of claim 1, further comprising the step of paying at least one of a death benefit and a cash value from the life insurance policy.

14. A computer program product for use with a computer, said computer program product comprising a computer usable medium having computer readable program code embodied therein, the computer readable program code including:

a base interest rate segment for applying a base interest rate to a value of a life insurance policy for a predefined period;

a point-to-point return segment for defining a point-to-point return for at least two indices over the predefined period;

a determining segment for determining a best performing index (Index 1) and a second best performing index (Index 2) by comparing the point-to-point returns of the at least two indices;

an adjusted index return segment for calculating an adjusted index return by adding a first weighted percentage of the value of the Index 1 return to a second weighted percentage of the value of the Index 2 return, wherein the first weighted percentage is greater than 50% and the second weighted percentage is equal to 100% minus the first weighted percentage; and an applying segment for determining the value of the life insurance policy after the predetermined period has ended, the value of the life insurance policy being based at least in part on the adjusted index return.

15. A computer system for adjusting a value of a life insurance policy comprising:

a physical computer-readable medium having computer readable program code embodied therein, the computer readable program code including:

a base interest rate segment for applying a base interest rate to a value of a life insurance policy for a predefined period, a point-to-point return segment for defining a point-to-point return for at least two indices over the predefined period, a determining segment for determining a best performing index (Index 1) and a second best performing index (Index 2) by comparing the point-to-point returns of the at least two indices, an adjusted index return segment for calculating an adjusted index return by adding a first weighted percentage of the value of the Index 2 return, wherein the first weighted percentage is greater than 50% and the second weighted percentage is equal to 100% minus the first weighted percentage, and an applying segment for determining the value of the life insurance policy after the predetermined period has ended, the value of the life insurance policy being based at least in part on the adjusted index return; and a processor adapted to execute the computer readable program code contained on the physical computer-readable medium.

* * * * *